US011332324B2

(12) United States Patent
Wallisch (10) Patent No.: US 11,332,324 B2
(45) Date of Patent: May 17, 2022

(54) TRANSPORT DEVICE HAVING TRANSPORT RAKE AND COUNTER RAKE (71) Applicant: Bausch + Ströbel Maschinenfabrik Ilshofen GmbH + Co. KG, Ilshofen (DE)

(72) Inventor: Manuel Wallisch, Vellberg (DE)

(73) Assignee: Bausch + Ströbel Maschinenfabrik Ilshofen GmbH + Co. KG, Ilshofen (DE)

( * ) Notice: Subject to any disclaimer, the term of this patent is extended or adjusted under 35 U.S.C. 154(b) by 0 days.

(21) Appl. No.: 16/981,841

(22) PCT Filed: Aug. 1, 2019

(86) PCT No.: PCT/EP2019/070778
§ 371 (c)(1),
(2) Date: Sep. 17, 2020

(87) PCT Pub. No.: WO2020/035324
PCT Pub. Date: Feb. 20, 2020

(65) Prior Publication Data
US 2021/0155420 A1 May 27, 2021

(30) Foreign Application Priority Data

Aug. 16, 2018 (DE) ..................... 10 2018 213 800.1

(51) Int. Cl.
*B65G 54/02* (2006.01)
*B65G 47/90* (2006.01)
*B65G 47/82* (2006.01)

(52) U.S. Cl.
CPC ............. *B65G 54/02* (2013.01); *B65G 47/82* (2013.01); *B65G 47/901* (2013.01); *B65G 47/907* (2013.01); *B65G 2201/0261* (2013.01)

(58) Field of Classification Search
CPC ...... B65G 47/82; B65G 54/02; B65G 47/901; B65G 47/90; B65G 47/907; B65G 47/92; B65G 37/005; B65G 2201/0261
(Continued)

(56) References Cited

U.S. PATENT DOCUMENTS 9,834,392 B2   12/2017  Raffaini et al.
2016/0289010 A1*  10/2016  Wipf .................. B65G 47/681

FOREIGN PATENT DOCUMENTS

CN    201702778 U   1/2011
DE    19936255 A1   2/2001
(Continued)

OTHER PUBLICATIONS

International Application No. PCT/EP2019/070778, "International Search Report and Written Opinion", dated Nov. 18, 2019, 17 pages.

*Primary Examiner* — James R Bidwell
(74) *Attorney, Agent, or Firm* — Kilpatrick Townsend & Stockton LLP (57) ABSTRACT

A transport device to transport items that includes a transport rake having at least one tine, and a counter rake having at least one tine. The counter rake is adjustable relative to the transport rake in a transport direction, clamping an item to be transported between the at least one tine of the transport rake and the at least one tine of the counter rake. At least one of the transport rake or counter rake connects to a transport element. The transport element is moveable linearly in the transport direction. The transport device further includes a drive system comprising a corresponding drive element that is not connected to the transport element.

18 Claims, 4 Drawing Sheets

(58) Field of Classification Search
USPC .................... 198/468.2, 468.5, 468.9, 817
See application file for complete search history.

(56) References Cited

FOREIGN PATENT DOCUMENTS

| | | | | |
|---|---|---|---|---|
| DE | 102014102630 A1 | 8/2015 | | |
| DE | 102015209618 A1 | 12/2016 | | |
| DE | 102015224874 A1 | 6/2017 | | |
| EP | 1847489 | * 10/2007 | ............. | B65G 47/90 |
| EP | 2495193 A1 | 9/2012 | | |
| EP | 2743192 A1 | 6/2014 | | |
| EP | 2923973 B1 | 5/2018 | | |
| ES | 2667440 A1 | 5/2018 | | |
| JP | 03270828 | 12/1991 | | |
| JP | 6-144567 | * 5/1994 | ............. | B65G 54/02 |
| WO | 2011016968 | * 2/2011 | ............. | B65G 47/90 |

* cited by examiner

Fig. 4

TRANSPORT DEVICE HAVING TRANSPORT RAKE AND COUNTER RAKE

CROSS REFERENCE TO RELATED APPLICATION

This application is a U.S. national phase of International Patent Application No. PCT/EP2019/070778 filed on Aug. 1, 2019, which claims priority to German Patent Application No. 10 201 213 800.1, filed in Germany on Aug. 16, 2018. The entire contents of both applications are hereby incorporated herein by this reference.

The invention relates to a transport device for an item to be transported, the device comprising a transport rake having at least one tine and a counter rake having at least one tine, the counter rake being adjustable relative to the transport rake in the transport direction in order to clamp an item to be transported between the at least one tine of the transport rake and the at least one tine of the counter rake.

A generic transport device of this kind is known from EP 3 072 834 A1.

With regard to the design of some embodiments, the present application relates to features which are disclosed in the description, the claims and the drawings of the German application having the file number DE 10 2018 211 839.6. The entire disclosure of application DE 10 2018 211 839.6 is therefore to be regarded as part of the description of this application.

When filling or manufacturing corresponding products, a large number of small containers often have to be moved precisely, for example under filling needles of a filling station. In particular in the field of manufacturing pharmaceutical products, vials, syringes, small bottles and the like are generally filled in clean rooms and in a sterilized state. Filling stations and also other processing stations, for example sealing stations, generally process or fill or seal one or a small number of containers, for example ten. Overall, however, a corresponding device has to process several thousand such small containers per hour for economic efficiency.

Accordingly, there is a need to move the small containers in groups or individually inside the clean room as efficiently as possible, in particular minimizing friction. This is because every instance of friction results in material abrasion, which can deteriorate the clean room quality.

For this purpose, EP 3 072 834 A1 proposes a transport device having a transport rake and a counter rake, containers being clamped between respective tines and being slightly lifted when there is a corresponding relative movement of the transport rake and the counter rake, whereupon a simultaneous movement of the transport rake and the counter rake can move the containers further in the desired direction.

The transport rake and the counter rake are each driven or moved by permanently installed drive arrangements, the transport rake and the counter rake each being fastened to a driven eccentric sheave of the relevant drive by means of a lever.

A disadvantage of this is, inter alia, that the range of movement and also the type of movement for the transport rake and the counter rake are clearly predetermined by the size and shape of the eccentric sheaves. In every situation there is thus only the option of performing an arcuate movement with the transport rake or the counter rake in one direction or in the other direction. In particular, it is not possible to move containers in a transport direction and at the same time to leave the containers in the same position transverse to the transport direction. Furthermore, the containers have to be set down several times and picked up again in order to move them from one end of the transport rake to the other end.

In addition, when using a corresponding transport rake and counter rake, all objects in the region of the transport rake and the counter rake must always be moved simultaneously, and therefore a fixed machine cycle has to be observed.

Furthermore, a complex mechanism is necessary to ensure the appropriate relative movement of the transport rake and the counter rake, and in particular also in the case where transferring the restricted freedom of movement of the eccentric sheaves one-to-one to the transport rake and the counter rake is not desired. This complex mechanism is also intended to be arranged in the clean room. If a malfunction occurs, the clean room must be opened accordingly and then sterilized again. The entire production must be stopped for a longer period.

The object of the present invention is therefore to overcome or to minimize the disadvantages of the known transport system.

This object is achieved by a transport device according to claim 1 and a system according to either claim 14 or claim 16, and a method according to claim 17.

The transport device according to the invention is characterized in that at least either the transport rake or the counter rake is connected to a movable transport element that is suitable for a purely linear movement in or against the transport direction, a drive system being provided by means of which the transport element can be moved in a purely linear manner in or against the transport direction.

As a result, there is greater freedom of movement since this is now based on the freedom of movement provided by the drive system. Furthermore, a complicated drive mechanism is avoided or is at least located a certain distance away from the rake and the counter rake. This reduces the frequency of maintenance and makes maintenance easier.

In a preferred variant, the transport device according to the invention is characterized in that at least either the transport rake or the counter rake is connected to two transport elements that are suitable for a purely linear movement in or against the transport direction and are movable relative to one another, a drive system being provided by means of which the transport elements can be moved in a purely linear manner in or against the transport direction.

Both the transport rake and the counter rake are preferably connected to at least one corresponding transport element and are preferably likewise not connected to any other drive device other than the corresponding transport elements.

As a result, the transport rake and the counter rake are movable at least linearly in the transport direction, insofar as the transport elements are movable in the transport direction by means of the drive system. Corresponding containers can thus in particular be transported in the transport direction without having to constantly set them down and grasp them again.

A corresponding rake is preferably connected to at least two transport elements, said elements being movable relative to one another. In addition to better support of the transport rake and thus a greater possible length of the rake, movement sequences which do not or do not only comprise a linear displacement in the transport direction can be achieved by an appropriate connection of the transport elements and the rake by means of the movement of the transport elements of a transport rake relative to one another.

Depending on the construction of the connection, the rake and/or the tines can be displaced transversely to the transport direction, or the transport rake can also be tilted or rotated. It would also be possible to be able to activate other functional elements on the rake in this way.

For example, each transport element is preferably fastened by means of two articulated rods which are articulated to the transport element and the rake. The relative distance between the two transport elements of the rake then determines in a simple manner how far the rake is from the transport elements and thus the position of the transport rake and the tines transverse to the transport direction.

This allows the rake and then of course similarly the counter rake to be moved back and forth transversely to the transport direction, whereby corresponding containers can be gripped in a larger region and whereby in particular containers that are precisely not to be transported can be placed slightly further away from the transport elements. This would allow other containers to be transported past these containers in the transport direction.

Both the transport rake and the counter rake are preferably connected to at least two of the transport elements, preferably each connected to different transport elements.

The transport elements of the transport rake and the counter rake are preferably movable in the transport direction on paths that extend so as to be offset in parallel. This means that the transport elements of the transport rake and the counter rake do not restrict one another in their range of movement.

Such movability on paths that extend in an offset manner can also be achieved in particular by the transport elements being not only linearly movable, but rather movable over an entire surface that is parallel to the transport direction, or orthogonally to the transport direction. This can be achieved, for example, by the transport elements being designed so as to have rotatable rollers in accordance with the corresponding features in the application DE 10 2018 211 839.6. This allows the transport elements of the transport rake and the counter rake to move apart from one another "upward" and "downward" and then be moved past one another.

In a preferred embodiment, the transport rake and the counter rake are interconnected in such a way that a movement relative to one another is possible. This can be achieved, for example, by one of the two having a slot that extends in the transport direction, in which slot a projection or the like of the other is movably mounted. However, other designs are also conceivable, for example interlocking rails and counter rails on the transport rake and the counter rake and/or rollers/rolls or the like on one rake and a running surface on the other rake. This can be advantageous since it increases the freedom of movement and thus the usage of the transport rake and the counter rake. At the same time, the transport rake and the counter rake can support one another or stabilize one another in position.

However, it is alternatively provided in another preferred variant that the transport rake and the counter rake are not interconnected. This can occur, for example, by the two being arranged at a slight distance one above the other and the tines being arranged at such a height that they can move past one another and simultaneously clamp a container therebetween.

The variant in which the transport rake and the counter rake are not interconnected can be used particularly preferably in combination with transport elements of the transport rake and the counter rake that extend on different paths. This is because the transport rake and the counter rake can then be moved completely past one another, meaning that the number of clamped items to be transported can be freely selected (since, depending on the relative position, a corresponding number of tines on the transport rake can interact with the tines of the counter rake), or the transport rake or the counter rake can also interact with other and equivalently constructed counter rakes or transport rakes.

However, in the variant in which the transport rake and the counter rake are not connected, the tines can also be arranged such that they are each at the same height. In the variant having not only linearly but two-dimensionally movable transport elements, the transport rake and the counter rake can still be separated from one another and moved past one another by the transport elements being shifted appropriately orthogonally to the transport direction.

The transport rake and/or the counter rake preferably comprise a support rod that extends in parallel with the transport direction, from which support rod the tines preferably extend orthogonally to the transport direction.

This is a relatively simple construction without a complicated mechanism. This is particularly advantageous in combination with the connection of the transport elements to the transport rake or the counter rake via hinged articulated rods. This is because it is a simple construction which, by means of a displacement of a plurality of transport elements of the transport rake or of the counter rake relative to one another, simultaneously allows precise positioning of the transport rake or the counter rake transversely to the transport direction.

Preferably, in particular in the variant having articulated rods between the transport elements and the transport rake or the counter rake, the transport elements are designed to be movable relative to one another in such a way that the distance from the tines and/or the support rod to the transport elements can be changed. Preferably, in particular in the variant having articulated rods between the transport elements and the transport rake or the counter rake, the transport elements are designed to be movable synchronously with one another in such a way that the tines and/or the support rod can be moved in the transport direction and against the transport direction, in particular can be moved in such a way that the distance from the tines and/or the support rod to the transport elements remains constant.

Both of the aforementioned aspects are preferably combined such that objects can be clamped by the catches at different distances from the transport elements and/or can be moved in the transport direction. This is preferably carried out such that the tines, by being positioned close to the transport elements, can be guided past objects positioned further away, then the distance between the tines and transport elements can be increased in order to clamp the objects, and subsequently, at this distance, the clamped objects can be moved in and/or against the transport direction and/or the objects can be moved toward the transport elements in order to be able to be moved in or against the transport direction at a smaller distance than the distance before the clamping by the tines, in particular in order to be moved past objects that are not clamped by the tines.

Embodiments of these preferred variants can be found in particular in the accompanying drawings and the relevant description. However, these preferred variants are not limited to the embodiments shown in the drawings.

The tines preferably have an elongate support rod portion that is arranged orthogonally to the support rod and a receiving region in which the tines taper in a direction orthogonal to the transport direction and orthogonal to the support rod portion. As a result, when the tines of the transport rake and of the counter rake interact, a tapering receiving portion is formed in which the item to be transported can be easily held.

By suitably selecting the shape of this tapered portion, the item to be transported that is to be received is immediately lifted slightly by movements of the transport rake and the counter rake toward one another.

Simple means are then used to ensure that when the item to be transported moves in the transport direction, no grinding occurs on a surface on which the item to be transported is placed.

The drive system preferably comprises a corresponding drive element to which the transport element is not connected and to which the transport element is coupled or by which the transport element is driven only by means of contactless remote forces. The freedom of movement of the drive element then determines that of the transport element. Furthermore, the drive mechanism can be arranged at a certain distance from the transport element, which makes maintenance easier.

However, the drive system can also be designed in another way, for example by the transport elements being driven by a linear drive or the drive system comprising a linear drive. Any drive system that is capable of causing a purely linear movement of the transport elements in or against the transport direction is suitable.

In a further variant, it can also be provided that the transport elements themselves are equipped with the drive system, for example by the transport element being designed as a vehicle having its own drive.

In various embodiments, a surface, rail and/or the like on or in which the transport elements move can have different orientations with respect to the transport direction, the surface, rail and/or the like preferably extending in parallel with the transport direction.

The surface, rail and/or the like on or in which the transport elements move can in particular also be parallel or orthogonal to a surface on which objects to be transported are placed. However, other orientations are also conceivable since, by means of the connection between the transport element and the transport rake or the counter rake, in particular by means of the articulated rods, said element and rake can be connected at a corresponding angle which compensates for an angle between the surface, rail and/or the like of the transport elements and a surface on which objects to be transported are placed and/or are to be placed.

A system according to the invention comprises a transport device according to any of the preceding claims and a clean room, with a transport rake, a counter rake and transport elements being arranged inside the clean room.

In such a system it is preferred that the drive element or drive elements of the transport device are arranged outside the clean room.

The entire drive mechanism for moving the drive element is thus provided outside the clean room, which makes maintenance easy and, at the same time, the drive system of the drive element cannot bring about a deterioration in the clean room quality.

In such a system having a clean room, a drive element outside the clean room, and a transport rake, a counter rake and a transport element inside the clean room, the transport element and the drive element can particularly preferably be designed in accordance with any of the forms disclosed in the application DE 10 2018 211 839.6. All of the features of a corresponding system having a clean room, a transport element and a drive element described in the application DE 10 2018 211 839.6 can be used in the present system according to the invention and are therefore incorporated by reference as corresponding embodiments and variants of this invention.

Protection is therefore sought for any combination of claim 1 with any of the features disclosed in application DE 10 2018 211 839.6 with respect to the system described therein comprising a clean room, a transport element that is movable inside the clean room, and a drive element of the transport element having coupling by means of contactless remote forces, which drive element is arranged outside the clean room; these features contribute to the achievement of the object on which the invention is based, since the corresponding features are alternatives and developments of the arrangement that is relevant to the present invention and comprises a transport element and a drive element contactlessly coupled thereto; these features and in particular the general description of the invention, the description of the embodiments and the claims of the application DE 10 2018 211 839.6 are hereby explicitly to be regarded as clearly belonging to this description of the present invention and thus to the disclosure of the invention described above and below.

A system according to the invention particularly preferably comprises a plurality of transport devices of one or more of the variants described above.

A method according to the invention for operating a transport device according to the invention or for operating a system according to the invention relates to such transport devices and/or systems according to the invention in which at least either the transport rake or the counter rake is connected to two movable transport elements that are suitable for a purely linear movement in or against the transport direction. The method according to the invention is used to move at least one object and/or one item to be transported that is on a transport surface, the transport surface preferably being spaced, orthogonally to the transport direction, from a region to which the transport elements can be moved. The method according to the invention is characterized in that, for transporting the item to be transported, between approaching the item that is to be transported and releasing the item to be transported, the two transport elements of the transport rake and/or of the counter rake move both synchronously and relative to one another and/or in that, in at least one step carried out between the start and the end of the method, the transport elements of the transport rake and/or of the counter rake move synchronously in and/or against the transport direction and, in at least one step carried out between the start and the end of the method, the transport elements of the transport rake and/or of the counter rake move relative to one another.

In other words, a method according to the invention is characterized in that the transport elements are moved both synchronously and relative to one another in the method.

The method according to the invention preferably comprises one, a plurality, or all of the following steps, preferably in alphabetical order:

a) moving the two transport elements of the transport rake and/or of the counter rake synchronously and/or in parallel until the tines are adjacent to the item to be transported and/or in a region between the item to be transported and the transport rake and/or the counter rake and/or the transport elements;

b) moving the two transport elements of the transport rake and/or of the counter rake relative to one another until the tines are at a distance from the transport elements which corresponds to the distance between the item to be transported and the transport elements;

c) moving the two transport elements of the transport rake and/or of the counter rake relative to one another until the tines clamp the item to be transported;

d) moving the two transport elements of the transport rake and/or of the counter rake relative to one another until the distance from the item to be transported and/or the tines to the transport elements reaches a desired value, preferably a value such that the tines cannot collide with a further item to be transported that is located on the transport surface;

e) moving the two transport elements of the transport rake and/or of the counter rake synchronously and/or in parallel until the tines are adjacent to a placement surface or a region of the transport surface on which the item to be transported is to be placed, or to a transfer station and/or work station at or in which the item to be transported is to be transferred and/or processed and/or placed, or to a transfer region in which the item to be transported is to be transferred and/or processed and/or placed;

f) moving the two transport elements of the transport rake and/or of the counter rake relative to one another until the item to be transported is adjacent to and/or above the placement surface, the region of the transport surface, the transfer station and/or work station and/or the transfer region;

g) moving the two transport elements of the transport rake and/or of the counter rake relative to one another until the item to be transported is released; and h) moving the two transport elements of the transport rake and/or of the counter rake relative to one another until the tines are close enough to the transport elements to avoid a collision with the item to be transported and/or other elements, preferably after step h), step a) being carried out again with respect to a further item to be transported, the steps preferably being applied simultaneously to a plurality of items to be transported in order to move a plurality of items to be transported simultaneously.

A synchronous and/or parallel movement of two transport elements is understood to mean that both transport elements move in such a way that their distance from one another remains the same. A relative movement of two transport elements is to be understood to mean that both transport elements move in such a way that their distance from one another changes, at least temporarily.

A preferred embodiment of the invention is explained with reference to the following drawings. All of the movement processes explained in this connection can be part of the method according to the invention in each case individually, but preferably in combination.

Figure 1:
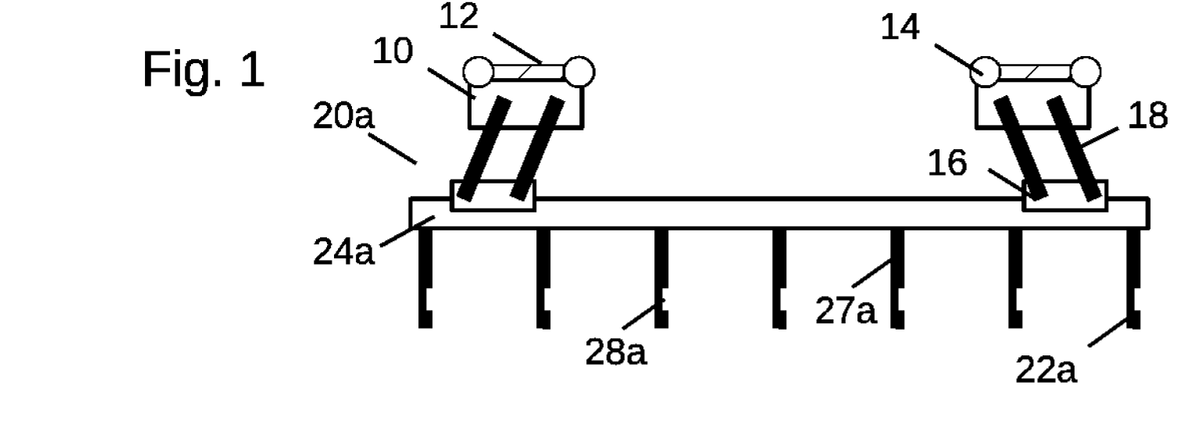
FIG. 1 is a schematic plan view of a transport rake having associated transport elements for a transport device according to the invention.

A transport device according to the invention comprises a transport rake 20a and a counter rake 20b. The transport rake 20a shown in FIG. 1 is designed for transport in a direction along or parallel to the elongate support rod 24a of the transport rake 20a.

From said transport rake, the tines 22a extend transversely to the transport direction. The tines 22a have an elongate support rod portion 27a in which a receiving region 28a is formed. This receiving region 28a is preferably tapered in a direction perpendicular to the image plane in FIG. 1. This creates an inclined surface by means of which the receiving region 28a can press a corresponding object slightly upward when acting thereon.

Figure 2:
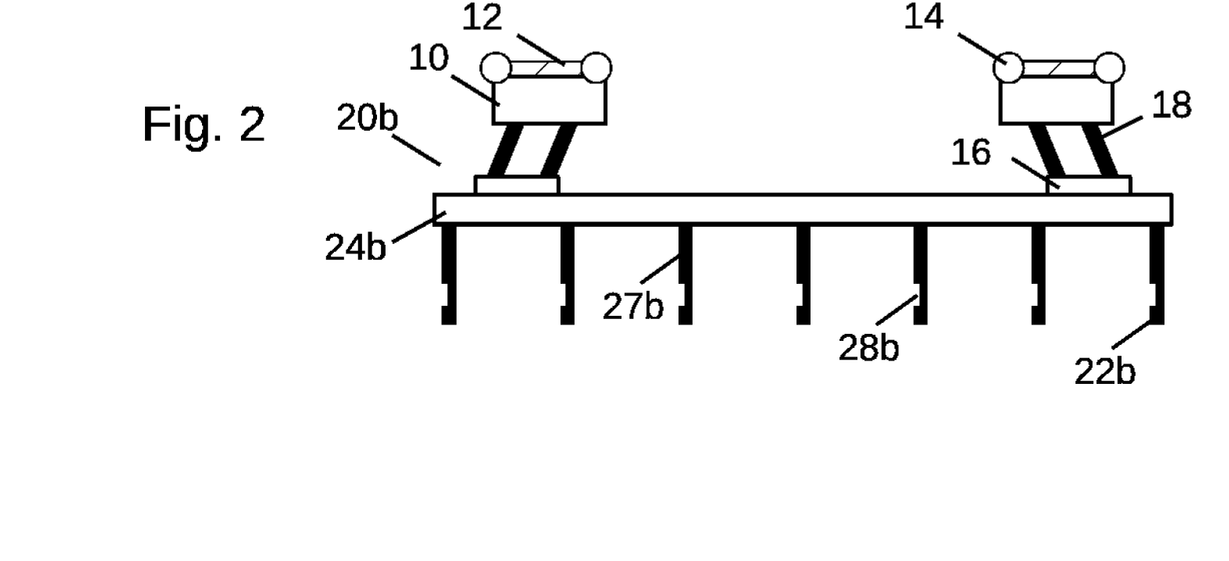
FIG. 2 is a schematic plan view of the associated counter rake having transport elements.

In the embodiment of the invention having a support rod 24b that extends in parallel with the transport direction, and tines 22b having an elongate support rod portion 27b and a receiving region 28b therein, the counter rake 20b is constructed substantially identically to the transport rake 20a, apart from the different orientation of the receiving region 28b. However, a different construction is also possible, as long as corresponding tines of the counter rake can interact with the tines of the transport rake for clamping an object or an item to be transported.

In the present embodiment, both the transport rake 20a and the counter rake 20b are each connected to two transport elements 10 which are movable linearly in the transport direction. The transport elements 10 comprise a magnetic device 12 and rollers 14. By means of the rollers 14, the transport elements 10 preferably travel on a planar surface or wall, drive elements being arranged on the other side of the wall, which drive elements also have magnetic devices, whereby the drive elements are coupled via their magnetic devices to the magnetic devices 12 of the transport elements 10 and thus a movement of the drive elements leads to a movement of the transport elements 10.

The transport elements 10 are rotatably articulated to the articulated rods 18, which in turn are rotatably articulated to the connecting piece 16. These connecting pieces 16 are in turn connected to the relevant support rod 24a or 24b that extends in parallel with the transport direction. In this case, the connecting pieces 16 that are connected to the transport rake 20a are attached to the top of the support rods 24a, while the connecting pieces 16 that are connected to the counter rake 20b are attached to the bottom of the corresponding support rod 24b.

As a result, there is nothing below the support rod 24a in the case of the transport rake 20a and nothing above the support rod 24b in the case of the counter rake 20b. As a result, the support rods 24a and 24b can be arranged one above the other at a short distance from one another such that the tines 22a and 22b are almost at the same height. Alternatively, a vertical offset can also be provided in the tines 22a and 22b and/or in the region of the elongate support rod portions 27a and 27b such that the receiving regions 28a and 28b are completely at the same height.

Figure 3A:
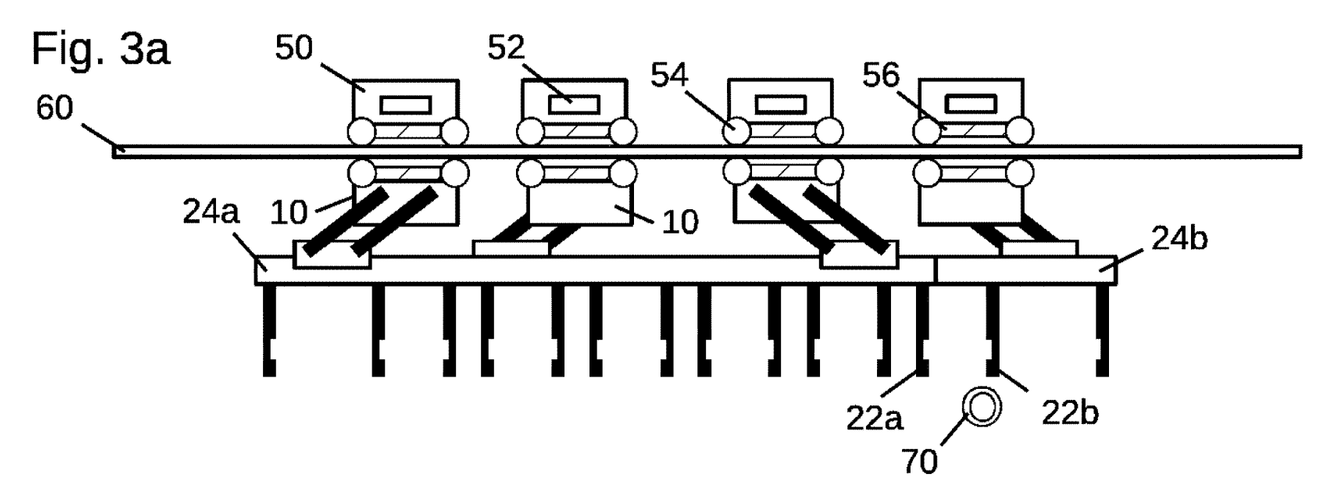
FIG. 3a to 3c are schematic plan views of a transport device according to the invention in the process of gripping/clamping a container.

An arrangement having support rods 24a, 24b one above the other is shown in FIG. 3a, in which the support rod 24b of the counter rake 20a is largely covered by the support rod 24a of the transport rake 20a in plan view. The transport elements 10 of the transport rake 20a and of the counter rake 20b are arranged alternately such that the transport rake 20a and the counter rake 20b cannot simply be separated by movements of the transport elements 10, at least if the transport elements 10 are on the same path and do not move on paths that extend so as to be offset in parallel. The tines 22a and 22b are then preferably also designed, for example having offset pieces, such that they are at the same height.

In the embodiment, the transport elements 10 travel on the wall 60, which is, for example, an outer wall of a clean room, such that the transport rake 20a and the counter rake 20b are located inside a clean room, while the drive elements 50, which likewise belong to the embodiment of the transport device according to the invention, travel or move on the outside of the wall 60 and thus outside the clean room.

The drive elements 50 have a motor 52 which drives the rollers or wheels 54. Due to the coupling of the drive elements 50 by means of the magnetic devices 56 to the magnetic devices 12 of the transport elements 10, the movements of the drive elements 50 are transmitted to the transport elements 10.

The drive elements 50 also have a controller (not shown) and batteries, rechargeable batteries or similar energy storage devices. By means of these programmable and/or remotely controllable controllers, the drive elements 50, which are actually movable independently of one another, are moved in a coordinated manner in order to bring about desired movements of the transport elements 10 and thus of the transport rake 20a and the counter rake 20b.

The magnetic devices 12 and 56 can in this case be designed in particular in the form of Hallbach arrays, as is described, for example, in the application DE 10 2018 211 839.6.

In FIG. 3a, the drive elements 50 are positioned such that the tines 22a and 22b of the transport rake 20a and of the counter rake 20b, respectively, are far apart from one another and such that the support rods 24a and 24b are relatively close to the transport elements 10. As can be seen, in the state in FIG. 3a, the transport device as a whole could be shifted to the left or right by moving the drive elements 50 simultaneously, without a tine 22a or 22b colliding with the object 50. The object or item to be transported 70 is, for example, a container, the outer circle representing the base surface, while the inner circle represents the opening that is further up and approximately at the height of the tines 22a, 22b or slightly above.

Figure 3B:
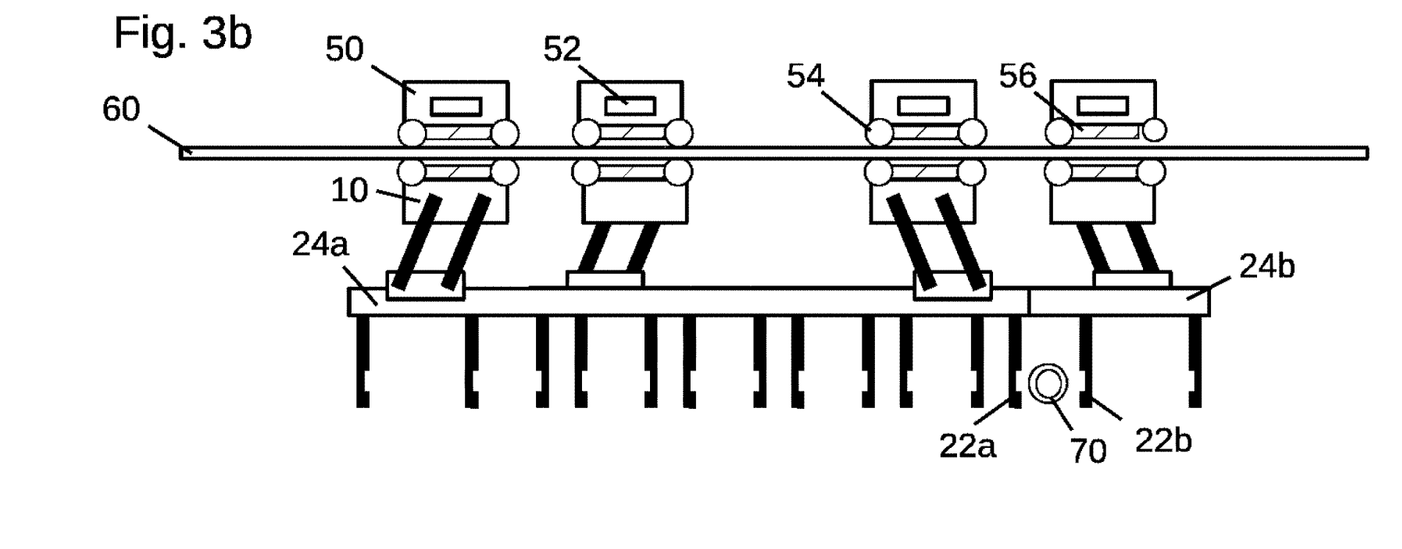

In order to clamp the item to be transported 70, the two left-hand drive elements 50 now substantially remain in their position, while the two right-hand drive elements 50 are moved a little to the right in relation to FIGS. 3a and 3b.

Since the distance between the two transport elements 10 of each of the transport rake 20a and the counter rake 20b thus changes, the angular position of the articulated rods 18 which connect the transport element 10 to the connecting piece 16 changes.

As a result, the support rods 24a and 24b of the transport rake 20a and the counter rake 20b, respectively, which rods extend in parallel with the transport direction, move away from the transport elements 10, whereby the tines 22a and 22b slide laterally past the item to be transported 70. In this case, the tines 22a, 22b do not necessarily have to be previously arranged so as to be offset from the item to be transported 70, as shown in FIG. 3a, but by appropriately coordinating the movement of the left-hand and right-hand transport elements 10, the tines 22a, 22b can also be moved directly vertically downward in relation to FIGS. 3a and 3b.

Figure 3C:
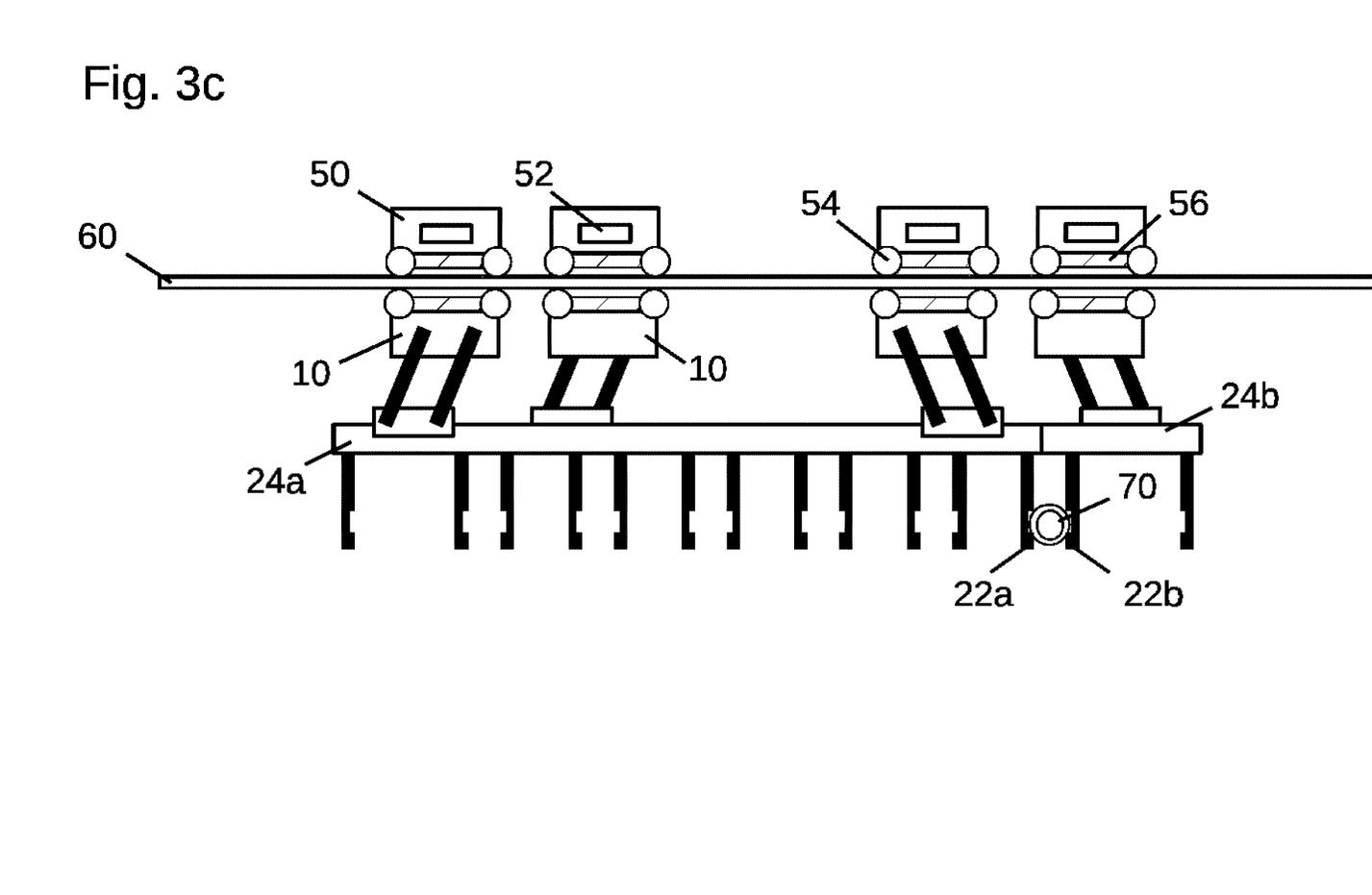

In order to clamp the item to be transported 70, the left-hand transport elements 10 and right-hand transport elements 10 of the transport rake 20a and the counter rake 20b are moved toward one another in each case. Since the distance between the two transport elements 10 of each of the transport rake 20a and the counter rake 20b now remains constant, the support rods 24a and 24b that extend in parallel with the transport direction remain at the same distance from the transport elements 10. Only the tines 22a, 22b are thus displaced, specifically the distance between said tines becomes smaller in accordance with the reduction in distance between the transport elements 10 of the transport rake 20a and of the counter rake 20b from one another. As shown in FIG. 3c, the item to be transported 70 is thus clamped.

If the receiving regions 28a, 28b are designed in terms of the shape, for example as recesses having a corresponding tapered portion and so as to match the shape of the item to be transported 70, when the item to be transported 70 is clamped the item to be transported 70 is simultaneously slightly lifted. The item to be transported 70 can thus be moved without grinding on the surface on which it previously stood.

In particular, following the situation in FIG. 3c, it would be possible, by moving the left-hand and right-hand transport elements 10 of the transport rake 20a and the counter rake 20b relative to one another in each case, in approximately the reverse of the movement from FIG. 3a to FIG. 3b, to move the support rods 24a and 24b closer to the transport elements 10 again when the item to be transported 70 is further clamped.

The now clamped item to be transported 70 could then be transported past a further item to be transported, which is as remote from the transport elements as the item to be transported 70 in FIG. 3a. This makes it possible to implement flexible timing and a flexible supply of an item to be transported 70 to different processing stations in the transport direction.

This is possible, for example, if there is a bead on the item to be transported 70 just below the opening, and the maximally projecting region of the receiving regions 28a, 28b engages just below the bead. Then, due to the clamping action, the item to be transported 70 is shifted slightly upward along the region of the receiving regions 28a, 28b which tapers upward.

As shown in FIGS. 3a to 3c, the transport system according to the invention allows the operation of the transport rake 20a and the counter rake 20b and the clamping of the item to be transported 70 by suitable parallel and relative movements of the drive elements 50 on the outside of a clean room, which drive elements can in principle each be controlled separately.

Any complicated drive device or drive mechanism or even only a complicated mechanism inside the clean room are also avoided, since the only mechanism inside the clean room are the rollers 14 and their axles or the like as well as the articulated rods 18 and their hinged connection to the transport elements 10 or to the connecting pieces 60. Possible connecting elements between the transport rake 20a and the counter rake 20b, for example rollers and a running surface. Each of these elements is relatively low-maintenance and durable.

In contrast, the relatively maintenance-intensive motors of the drive elements 50 are easily accessible; in particular, a defective drive element 50 can also be removed directly by overcoming the magnetic attraction forces between the magnetic devices 12 and 56 and replaced by a similar drive element 50.

This means that maintenance, replacement and repair can be carried out even during operation while a large batch of objects is being filled in a clean room. This is because the transport rake and the counter rake only have to be stopped for as long as it takes to replace a drive element 50 and for the electronic integration into the coordinated controller for the new drive element 50. This period of time can be less than a minute. An automatic device for replacing corresponding drive elements can possibly also be provided on the outside of the clean room.

However, a transport device according to the invention does not necessarily have to be operated using the drive elements 50 shown. In principle, any type of drive element or drive system is conceivable that allows corresponding independent actuation of the transport elements 10 in order to generate the various movement sequences; in particular all drive methods and drive elements disclosed in the application DE 10 2018 211 839.6 are conceivable for this.

Figure 4:
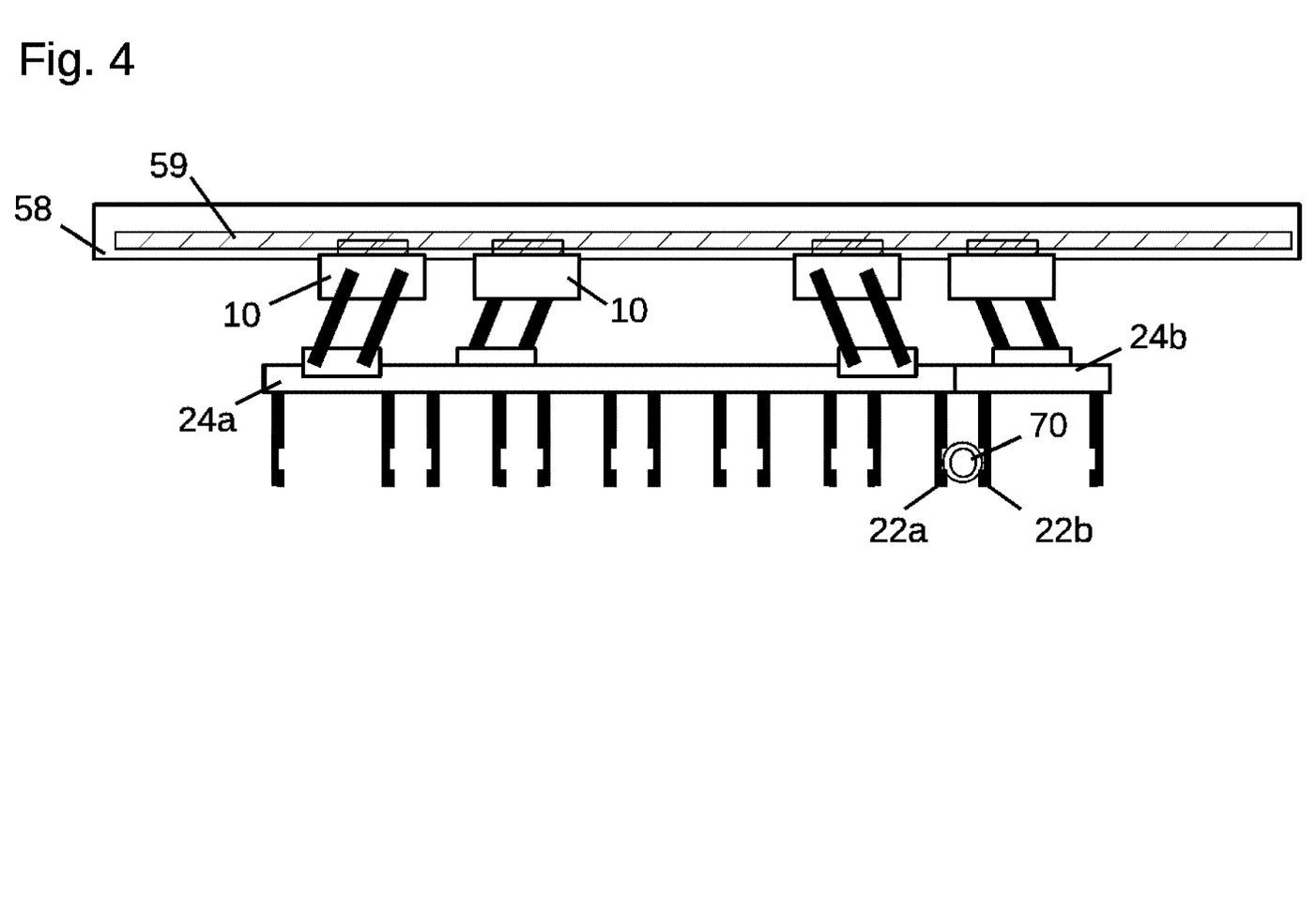
FIG. 4 is a schematic plan view of a transport device according to the invention having another variant of the drive system.

An example of another drive system is shown in FIG. 4, in which the drive system is or comprises a linear drive, the transport elements 10 running on a rail 58 which contains a corresponding magnetic drive 59.

The invention claimed is:

1. A transport device for an item to be transported, the device comprising:
    a transport rake having at least one tine; and
    a counter rake having at least one tine,
the counter rake being adjustable relative to the transport rake in a transport direction in order to clamp an item to be transported between the at least one tine of the transport rake and the at least one tine of the counter rake,
wherein at least either the transport rake or the counter rake is connected to a movable transport element that is suitable for a purely linear movement in or against the transport direction, a drive element being provided by means of which the transport element can be moved in a purely linear manner in or against the transport direction, and
wherein (a) the transport element and (b) the transport rake or the counter rake are interconnected via at least one, articulated rod which is rotatably fastened in an articulated manner both (1) to the transport element and (2) to the transport rake or the counter rake so as to have an axis of rotation perpendicular to the transport direction.

2. The transport device for an item to be transported according to claim 1, wherein at least either the transport rake or the counter rake is connected to two transport elements that are suitable for a purely linear movement in or against the transport direction and are movable relative to one another, a drive system being provided by means of which the transport elements can be moved in a purely linear manner in or against the transport direction.

3. The transport device for an item to be transported according to claim 1, wherein the transport rake or the counter rake is connected to at least two transport elements, said transport elements being movable relative to one another.

4. The transport device for an item to be transported according to claim 1, wherein the transport rake and the counter rake are interconnected with a possibility of a movement relative to one another.

5. The transport device for an item to be transported according to claim 1, wherein both the transport rake and the counter rake are connected to at least one of the transport elements, each connected to at least two of the transport elements.

6. The transport device for an item to be transported according to claim 5, wherein transport elements of the transport rake and the counter rake are movable in the transport direction on paths that extend so as to be offset in parallel.

7. The transport device for an item to be transported according to claim 5, wherein the transport rake and the counter rake are not interconnected.

8. The transport device for an item to be transported according to claim 7, wherein the transport rake and the counter rake are movable in the transport direction independently of one another.

9. The transport device for an item to be transported according to claim 1, wherein the tines have an elongate support rod portion and a receiving region in which the tines taper in a direction orthogonal to an elongate direction of extension.

10. The transport device for an item to be transported according to claim 1, wherein the transport rake or the counter rake comprises a support rod that extends in parallel with the transport direction, from which support rod the tines extend orthogonally to the transport direction.

11. A transport device for an item to be transported, the device comprising:
    a transport rake having at least one tine; and
    a counter rake having at least one tine,
the counter rake being adjustable relative to the transport rake in a transport direction in order to clamp an item to be transported between the at least one tine of the transport rake and the at least one tine of the counter rake,
wherein at least either the transport rake or the counter rake is connected to a movable transport element that is suitable for a purely linear movement in or against the transport direction, a drive element being provided by means of which the transport element can be moved in a purely linear manner in or against the transport direction, and
wherein a drive system comprises a drive element to which the transport element is not connected and to which the transport element is coupled or by which the transport element is driven only by means of contactless remote forces.

12. The transport device for an item to be transported according to claim 1, wherein a drive system comprises a linear drive.

13. A system, comprising:
    a transport device comprising:
        a transport rake having at least one tine; and
        a counter rake having at least one tine, the counter rake being adjustable relative to the transport rake in the transport direction in order to clamp an item to be transported between the at least one tine of the transport rake and the at least one tine of the counter rake, wherein at least either the transport rake or the counter rake is connected to a movable transport element that is suitable for a purely linear movement in or against a transport direction, a drive element being provided by means of which the transport element can be moved in a purely linear manner in or against the transport direction;
    a clean room, wherein the transport rake, the counter rake and the transport element are arranged inside the clean room; and
    wherein a drive system comprises a drive element to which the transport element is not connected and to which the transport element is coupled or by which the transport element is driven only by means of contactless remote forces, and wherein the drive element of the transport device is arranged outside the clean room.

14. The system according to claim 13, further comprising a plurality of the transport devices.

15. A method for operating a transport device, wherein the transport device comprises:
    a transport rake having at least one tine; and
    a counter rake having at least one tine, the counter rake being adjustable relative to the transport rake in a transport direction in order to clamp an item to be transported between the at least one tine of the transport rake and the at least one tine of the counter rake, wherein at least either the transport rake or the counter rake is connected to a movable transport element that is suitable for a purely linear movement in or against the transport direction, a drive element by which the transport element can be moved in a purely linear manner in or against the transport direction, wherein at least either the transport rake or the counter rake is connected to two movable transport elements that are suitable for a purely linear movement in or against the transport direction, in order to move at least one object or one item to be transported that is on a transport surface wherein for transporting the item to be transported, between approaching the item to be transported and releasing the item to be transported, the two transport elements of the transport rake or of the counter rake move both synchronously and relative to one another or in at least one step, the transport elements of the transport rake or of the counter rake move synchronously in or against the transport direction and, in at least one step, the transport elements of the transport rake or of the counter rake move relative to one another.

16. The method according to claim 15, comprising one or more of the following steps:

a) moving the two transport elements of the transport rake or of the counter rake synchronously or in parallel until the tines are adjacent to the item to be transported or in a region between (i) the item to be transported and (ii) the transport rake or the counter rake or the transport elements;

b) moving the two transport elements of the transport rake or of the counter rake relative to one another until the tines are at a distance from the transport elements which corresponds to the distance between the item to be transported and the transport elements;

c) moving the two transport elements of the transport rake or of the counter rake relative to one another until the tines clamp the item to be transported;

d) moving the two transport elements of the transport rake or of the counter rake relative to one another until the distance from the item to be transported or the tines to the transport elements reaches a desired value;

e) moving the two transport elements of the transport rake or of the counter rake synchronously or in parallel until the tines are adjacent to a placement surface or a region of the transport surface on which the item to be transported is to be placed, or to a transfer station or work station at or in which the item to be transported is to be transferred or processed or placed, or to a transfer region in which the item to be transported is to be transferred or processed or placed;

f) moving the two transport elements of the transport rake or of the counter rake relative to one another until the item to be transported is adjacent to or above the placement surface, the region of the transport surface, the transfer station and/or work station and/or the transfer region;

g) moving the two transport elements of the transport rake or of the counter rake relative to one another until the item to be transported is released; and h) moving the two transport elements of the transport rake or of the counter rake relative to one another until the tines are close enough to the transport elements to avoid a collision with the item to be transported or other elements.

17. The method according to claim 16, further comprising after step h), repeating step a) with respect to a further item to be transported, wherein the steps are applied simultaneously to a plurality of items to be transported in order to move a plurality of items to be transported simultaneously.

18. The method according to claim 15, wherein the transport surface is spaced, orthogonally to the transport direction, from a region to which the transport elements can be moved.

* * * * *